(12) United States Patent
Nakamura et al.

(10) Patent No.: US 9,303,973 B2
(45) Date of Patent: Apr. 5, 2016

(54) DISPLACEMENT DETECTION APPARATUS

(71) Applicant: DMG MORI SEIKI CO., LTD., Yamato-Koriyama, Nara (JP)

(72) Inventors: Yusuke Nakamura, Isehara (JP); Yoshiyuki Mitera, Isehara (JP); Hideaki Tamiya, Isehara (JP)

(73) Assignee: DMG MORI SEIKI CO., LTD., Nara (JP)

( * ) Notice: Subject to any disclaimer, the term of this patent is extended or adjusted under 35 U.S.C. 154(b) by 0 days.

(21) Appl. No.: 14/790,835

(22) Filed: Jul. 2, 2015

(65) Prior Publication Data

US 2016/0003605 A1 Jan. 7, 2016

(30) Foreign Application Priority Data

Jul. 2, 2014 (JP) ................................. 2014-136970

(51) Int. Cl.
*G01B 9/02* (2006.01)
*G01D 5/26* (2006.01)
*G01B 11/02* (2006.01)

(52) U.S. Cl.
CPC .......... *G01B 9/02015* (2013.01); *G01B 11/026* (2013.01); *G01D 5/266* (2013.01)

(58) Field of Classification Search
CPC ........... G01B 9/02015; G01B 9/02017; G01B 9/02019; G01B 11/026; G01B 2290/30; G01D 5/266; G01D 5/38
USPC ................................................ 356/498, 499
See application file for complete search history.

(56) References Cited

U.S. PATENT DOCUMENTS

| 3,726,595 | A | * | 4/1973 | Matsumoto | ........ G02B 27/4255 356/499 |
| 5,249,032 | A | * | 9/1993 | Matsui | ..................... G01D 5/38 250/237 G |
| 5,499,096 | A | * | 3/1996 | Tamiya | ..................... G01D 5/38 356/494 |
| 5,640,239 | A | * | 6/1997 | Takamiya | ............... G01P 3/366 356/28.5 |
| 2005/0057757 | A1 | * | 3/2005 | Colonna De Lega | .................. G01B 11/0675 356/497 |
| 2011/0255096 | A1 | | 10/2011 | Deck et al. | |
| 2013/0250307 | A1 | | 9/2013 | Tamiya | |
| 2013/0335746 | A1 | * | 12/2013 | Huber | .................. G01B 11/026 356/498 |
| 2015/0268031 | A1 | | 9/2015 | Zhu et al. | |

FOREIGN PATENT DOCUMENTS

| EP | 2 587 212 A2 | 5/2013 |
| JP | H05089480 | 4/1993 |
| WO | 2011/126610 A2 | 10/2011 |
| WO | 2014/071806 A1 | 5/2014 |

OTHER PUBLICATIONS

Nov. 9, 2015 extended Search Report issued in European Patent Application No. 15174963.7.

* cited by examiner

*Primary Examiner* — Tarifur Chowdhury
*Assistant Examiner* — Jonathon Cook
(74) *Attorney, Agent, or Firm* — Oliff PLC

(57) ABSTRACT

A first light flux serving as object light is caused to enter a member to be measured, and reflected light thereof is caused to enter again the member to be measured after being diffracted by a first diffraction grating. Then, the second-time reflected light of the first light flux by the member to be measured is diffracted by a second diffraction grating. By diffracting the first light flux by the second diffraction grating, a change of the optical path length caused by tilting of the member to be measured is cancelled.

5 Claims, 10 Drawing Sheets

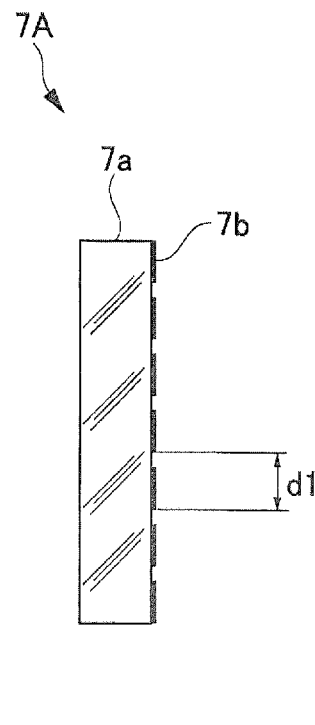
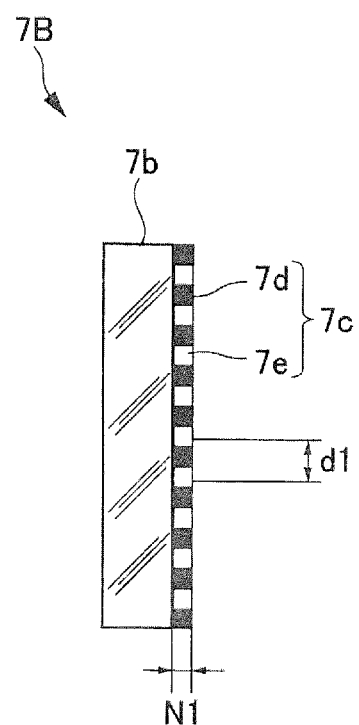

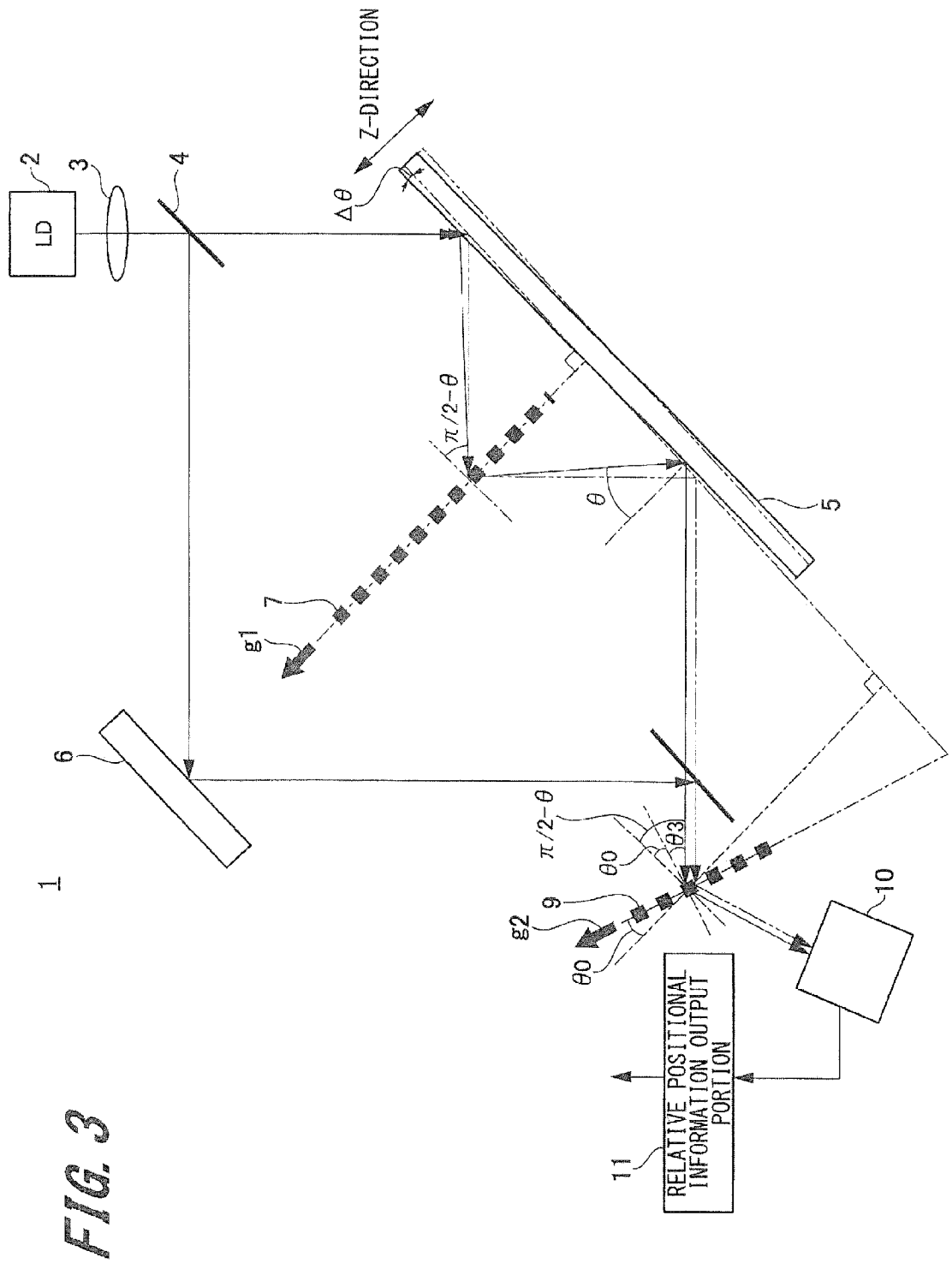

DISPLACEMENT DETECTION APPARATUS

CROSS REFERENCES TO RELATED APPLICATIONS

The present invention contains subject matter related to Japanese Patent Applications JP2014-136970, filed in the Japanese Patent Office on Jul. 2, 2015 respectively, the entire contents of which being incorporated herein by reference.

BACKGROUND OF THE INVENTION

1. Field of the Invention

The present invention relates to a displacement detection apparatus that detects a displacement of a surface to be measured, by means of a contactless sensor using the light emitted from a light source, and more specifically relates to a technique for detecting a displacement in a direction perpendicular to a surface to be measured.

2. Description of the Related Art

Conventionally, as the apparatus that contactlessly measures a displacement and/or shape of a surface to be measured, a displacement detection apparatus using light has been widely used. As a typical example, there is a method comprising the steps of: irradiating a surface to be measured with a laser beam; and detecting a change of the position of reflected light with a PSD. However, the method has problems that it is susceptible to the gradient of a surface to be measured, the sensitivity is low, and the resolution of measurement will decrease when the measurement range is extended.

On the other hand, there is a method using a Michelson's interferometer, with a surface to be measured as a mirror. The method has a wider detection range and is excellent in linearity, but will be affected by a change of the wavelength of a light source and a change in the refractive index of the air when the measurement range is extended.

On the other hand, there is a method (for example, see Japanese Laid-Open Patent Publication No. 1993-89480 (Patent Literature 1)) of detecting a displacement of the surface to be measured by: converging the light emitted from a light source by an objective lens on a surface to be measured; converging reflected light reflected by the surface to be measured by an astigmatic optical element; causing the converged light to enter a light receiving element to generate a focus error signal using an astigmatic method; then driving a servo mechanism using the focus error signal to displace the objective lens so that the focus position of the objective lens exists in the surface to be measured; and at this time, reading the scale mark of a linear scale that is integrally attached to the objective lens via a coupling member. The method is less likely to be affected by a change of the gradient of a surface to be measured. Therefore, the method has an advantage in that a displacement of the surface to be measured can be measured across a large measurement range with a high resolution.

In the displacement detection apparatus disclosed in Patent Literature 1, in order to increase the accuracy in detecting a displacement, the diameter of a beam to be converged on a surface to be measured is reduced by increasing the numerical aperture (NA) of the objective lens. For example, if the diameter of a beam focused on a surface to be measured is set to approximately 2 µm, then the accuracy in detecting the linear scale results in approximately several nanometers to approximately 100 plus several nanometers.

SUMMARY OF THE INVENTION

However, in the conventional displacement detection apparatus described in Patent Literature 1, the objective lens is vertically moved in the optical axis direction by a driving mechanism, for example such as an actuator using a magnet and a coil. Therefore, the mechanical response frequency of the vertical motion of the objective lens is restricted by the structure and/or mass of the actuator. As a result, in the displacement detection apparatus described in Patent Literature 1, the use conditions are limited.

An object of the present invention is to provide a displacement detection apparatus capable of detecting a displacement in the height direction of a member to be measured, with a high precision, and also capable of performing a high-speed and stable measurement.

According to an aspect of the present invention, the displacement detection apparatus of the present invention includes a light source configured to emit light, a light flux dividing portion, a first diffraction grating, a reflection portion, a light flux coupling portion, a second diffraction grating, and a relative positional information output portion. The light flux dividing portion divides the light emitted from the light source into a first light flux and a second light flux. The first diffraction grating is a transmission-type diffraction grating that diffracts the first light flux divided by the light flux dividing portion and reflected by a surface to be measured of a member to be measured and causes the diffracted first light flux to enter again the surface to be measured of the member to be measured. The reflection portion reflects the second light flux divided by the light flux dividing portion. The light flux coupling portion couples the first light flux, which is caused to enter the surface to be measured of the member to be measured after being diffracted by the first diffraction grating and is reflected by the surface to be measured of the member to be measured, and the second light flux reflected by the reflection portion. The light receiving portion receives interference light that is obtained by coupling the first light flux and the second light flux by the light flux coupling portion. The second diffraction grating is a transmission-type diffraction grating that is arranged on an optical path between the member to be measured and the light receiving portion of the first light flux, the second diffraction grating being configured to diffract the first light flux, which is caused to enter the surface to be measured of the member to be measured after being diffracted by the first diffraction grating and is reflected by the surface to be measured of the member to be measured. The relative positional information output portion outputs displacement information in the height direction of the surface to be measured of the member to be measured, based on the intensity of the interference light received by the light receiving portion.

According to the present invention, there is provided a displacement detection apparatus capable of detecting a displacement in the height direction of a member to be measured with a high precision and performing a high-speed and stable measurement even when the member to be measured is tilted.

BRIEF DESCRIPTION OF THE DRAWINGS

FIG. 2A is a cross sectional view illustrating an example of a first diffraction grating, and FIG. 2B is a cross sectional view illustrating another example of the first diffraction grating.

FIG. 3 illustrates an optical path when the surface of a member to be measured is tilted, with an axis perpendicular to a plane, in which an optical path of a first light flux is formed, as a rotation axis.

DESCRIPTION OF THE PREFERRED EMBODIMENTS

It should be understood by those skilled in the art that various modifications, combinations, sub-combinations and alterations may occur depending on design requirements and other factors insofar as they are within the scope of the appended claims or the equivalents thereof.

Hereinafter, examples of displacement detection apparatuses according to embodiments of the present invention are described with reference to the accompanying drawings. The embodiments of the present invention are described in an order below. Note that the technique of the present invention is not limited to the following examples.

1. First Embodiment: a displacement detection apparatus having arranged therein a diffraction grating that cancels a change of an optical path length
  1-1. Configuration
  1-2. Displacement Detection Method
2. Second Embodiment: a displacement detection apparatus having arranged therein a diffraction grating that cancels a change in an optical path length and a change of the wavelength of a light source
3. Third Embodiment: a displacement detection apparatus having arranged therein a diffraction grating that cancels a change in an optical path length and a change of the wavelength of a light source
  3-1. Configuration
  3-2. Displacement Detection Method
4. Use Examples of Displacement Detection Apparatus <<First Embodiment: A Displacement Detection Apparatus Having Arranged Therein a Diffraction Grating That Cancels a Change of an Optical Path Length>>

[1-1. Configuration]

Figure 1:
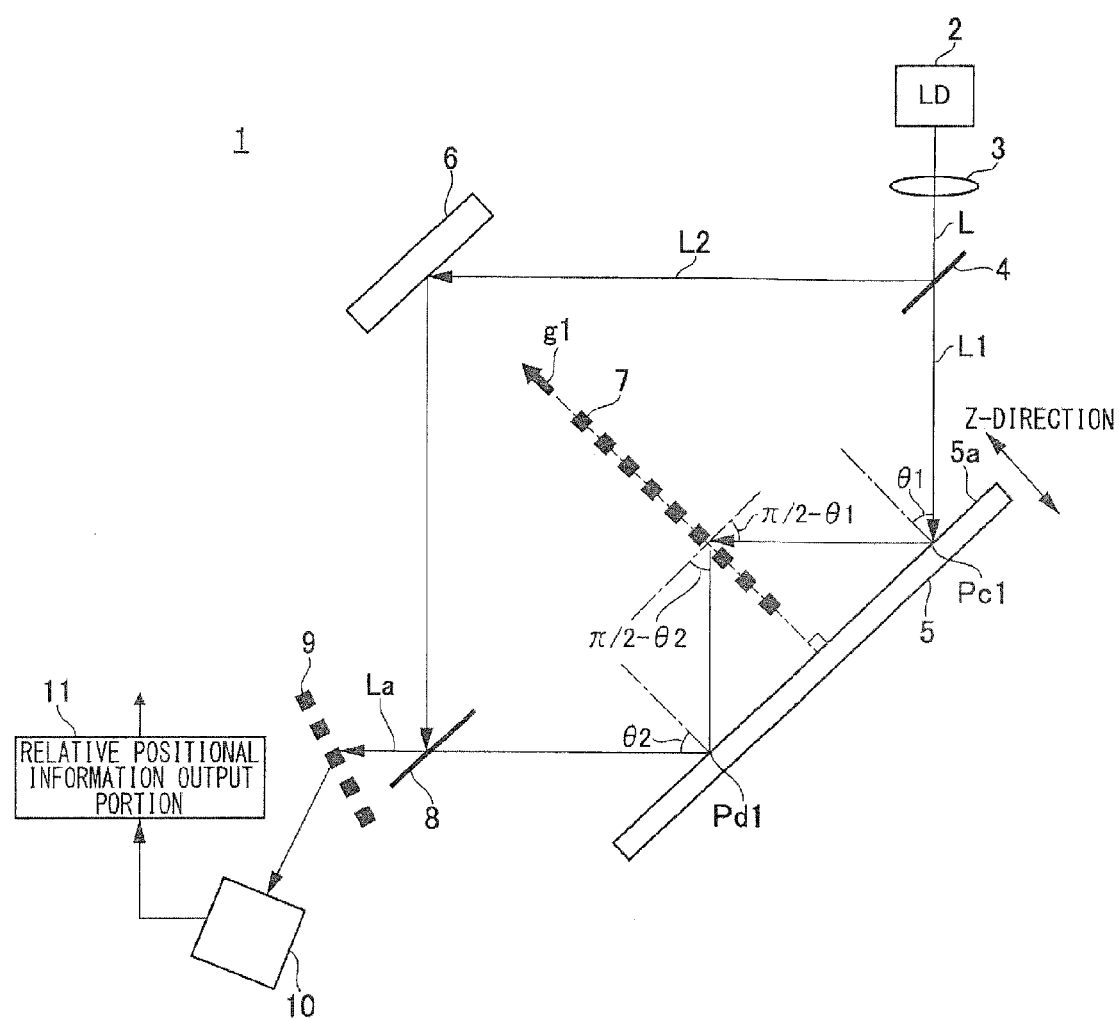
FIG. 1 is a schematic configuration diagram of a displacement detection apparatus according to a first embodiment of the present invention.

FIG. 1 is a schematic configuration diagram of a displacement detection apparatus according to a first embodiment of the present invention. A displacement detection apparatus 1 according to the embodiment detects a displacement in the height direction of a member to be measured 5, using a transmission-type first diffraction grating 7. Here, the height direction refers to a direction perpendicular to a surface to be measured 5a when the surface to be measured 5a of the member to be measured is assumed to be a plane, and is indicated as a z-direction in FIG. 1. As illustrated in FIG. 1, the displacement detection apparatus 1 includes a light source 2, a light flux dividing portion 4, a first diffraction grating 7, a reflection portion 6, a light receiving portion 10, a second diffraction grating 9, and a relative positional information output portion 11.

A semiconductor laser diode, a super luminescence diode, a gas laser, a solid state laser, a light emitting diode, or the like can be used as the light source 2, for example.

If a light source with a long coherence length is used as the light source 2, the displacement detection apparatus 1 becomes less affected by a difference in the optical path length between object light and reference light due to the tilting or the like of the surface to be measured 5a of the member to be measured 5, and thus the tilt allowable range will extend. Moreover, as the coherence length of the light source 2 becomes shorter, it is possible to prevent the noise caused by the interference from unwanted stray light and to perform more accurate measurement.

Furthermore, when a single-mode laser is used as the light source 2, the temperature of the light source 2 is preferably controlled in order to stabilize the wavelength. Moreover, the coherence of light may be reduced by superposing a high frequency signal and the like onto the light of the single-mode laser. Furthermore, also when a multi-mode laser is used as the light source 2, the noise caused by the interference from unwanted stray light can be prevented by controlling the temperature of the light source 2 with a Peltier element or the like, thereby allowing further stable measurement.

Note that, the number of light sources 2 is not limited to one, but a plurality of light sources 2 maybe arranged to superpose the light of the respective light sources 2, thereby increasing the amount of light.

Light L emitted from the light source 2 enters the light flux dividing portion 4. Note that a lens 3 including a collimate lens and the like is arranged between the light source 2 and the light flux dividing portion 4. The lens 3 collimates the light emitted from the light source 2 to parallel light. Therefore, the light collimated to the parallel light by the lens 3 is caused to enter the light flux dividing portion 4. Additionally, between the light source 2 and the light flux dividing portion 4, a lens may be arranged which converges light onto the member to be measured 5 or converges light onto a light receiving element of the light receiving portion 10 described later.

The light flux dividing portion 4 divides the collimated light into a first light flux L1 serving as object light and a second light flux L2 serving as reference light. The first light flux L1 is irradiated to the member to be measured 5, while the second light flux L2 is irradiated to the reflection portion 6 for reference light. As the light flux dividing portion 4, a polarization beam splitter and a half mirror can be used, for example.

In the embodiment, the polarization beam splitter is used as the light flux dividing portion 4. Accordingly, the light flux dividing portion 4 according to the embodiment reflects s-polarized light among the incident light and transmits p-polarized light, and therefore the first light flux L1 divided by the light flux dividing portion 4 is the p-polarized light and the second light flux L2 is the s-polarized light.

Moreover, a polarizing plate may be provided between the light source 2 and the light flux dividing portion 4, so that leakage light that slightly exists as the polarization components perpendicular to the respective polarized lights and noise can be removed.

In the displacement detection apparatus 1 according to the embodiment, a displacement of the member to be measured 5 in the height direction (i.e., the z-direction illustrated in FIG.

1) perpendicular to the surface to be measured 5*a* of the member to be measured 5 arranged in a position illustrated in FIG. 1 is detected. Note that, a mirror can be cited as the example of the member to be measured 5, a displacement of which can be detected by the displacement detection apparatus 1 according to the embodiment. Other than the mirror, a member provided with a surface that can reflect light, for example such as the surface of a glass substrate, the surface of a silicon wafer, the surface of a reflection film, and the surface of a middle layer of a reflection film, can be used as the member to be measured 5 and the surface height thereof can be measured.

The member to be measured 5 is arranged in a position, where the first light flux L1 divided by the light flux dividing portion 4 is reflected and caused to enter the first diffraction grating 7 and the first light flux L1 diffracted by the first diffraction grating 7 is reflected again and caused to enter the light flux coupling portion 8.

The first diffraction grating 7 is a transmission-type diffraction grating, and is arranged so that a grating vector g1 becomes substantially perpendicular to the surface to be measured 5*a* of the member to be measured 5, i.e., so that the angle formed by the diffracting plane of the first diffraction grating 7 and the surface to be measured 5*a* of the member to be measured 5 becomes approximately 90°. Here, the grating vector g1 points a direction parallel to a direction along which grating patterns of the first diffraction grating 7 are arranged, as illustrated in FIG. 1.

Note that, accuracy in the arrangement of the first diffraction grating 7 with respect to the member to be measured 5 is variously set in accordance with a measurement accuracy requested to the displacement detection apparatus 1. That is, when a high accuracy is requested to the displacement detection apparatus 1, the first diffraction grating 7 is preferably arranged in a range of 90°±0.5° with respect to the surface to be measured 5*a* of the member to be measured 5. On the other hand, even if the first diffraction grating 7 is arranged in a range of 90±2° with respect to the surface to be measured 5*a* of the member to be measured 5, it is sufficient when the displacement detection apparatus 1 is used in low-precision measurement of a machine tool or the like.

Moreover, the first light flux L1 reflected by the surface to be measured 5*a* of the member to be measured 5 enters the first diffraction grating 7, and the first light flux L1 incident on the first diffraction grating 7 is diffracted by the first diffraction grating 7. A grating pitch d1 of the first diffraction grating 7 may be or may not be set so that the diffraction angle becomes substantially equal to an incidence angle on the first diffraction grating 7. When an incidence angle in the first-time incidence on the surface to be measured 5*a* of the first light flux L1 is designated by θ1, an incidence angle in the second-time incidence on the surface to be measured 5*a* of the first light flux L1 is designated by θ2, and the wavelength is designated by λ, the grating pitch d1 of the first diffraction grating 7 is preferably set to a value satisfying a Bragg's conditional equation below, $$d1 = n\lambda/(\sin(\pi/2-\theta1)+\sin(\pi/2-\theta2))$$ (Formula 1)

where n is a positive order.

Note that, as described above, the first diffraction grating 7 is arranged so that the grating vector g1 becomes perpendicular) (90° to the surface to be measured 5*a* of the member to be measured 5, and therefore the incidence angle on the first diffraction grating 7 of the first light flux L1 is π/2−θ1.

Here, an example of the diffraction grating applicable as the first diffraction grating 7 is described. FIG. 2A is a cross sectional view illustrating an example of the first diffraction grating 7, and FIG. 2B is a cross sectional view illustrating another example of the first diffraction grating 7.

In a first diffraction grating 7A illustrated in FIG. 2A, a grating portion 7*b* made of chromium (Cr), for example, is formed in one surface of a substantially transparent glass substrate 7*a*. Usually, the grating portion 7*b* is formed by vacuum-depositing a thin film of chromium or the like in one surface of the glass substrate 7*a*, and therefore the thickness thereof is equal to or less than 1 μm.

A first diffraction grating 7B illustrated in FIG. 2B is a so-called volume-type hologram using a photographic plate. An absorption-type hologram may be used, but a phase-type hologram is described here. A grating portion 7*c* in the first diffraction grating 7B is formed as follows, for example.

First, photosensitive silver-salt emulsion is applied to one surface of the glass substrate 7*a*, an interference pattern is exposed and developed, and is then bleached. Thereby, a portion 7*d* where a silver particle is left and a portion 7*e* where the silver particle is not left are formed in the grating portion 7*c*. Here, the refractive index of the portion 7*d* where the silver particle is left increases while the refractive index of the portion 7*e* where the silver particle is not left decreases. That is, the grating portion 7*c* is a phase-type hologram. Moreover, photopolymer for hologram recording may be used as the material, instead of the photographic plate.

In the case of the first diffraction grating 7B having such a configuration, once light is incident at a predetermined angle (incidence angle), the light is output (diffracted) at a predetermined angle (diffraction angle). Furthermore, when the Bragg's condition shown in Formula 1 is satisfied, the output of the diffracted light diffracted by the first diffraction grating 7B can be maximized. That is, it is possible to prevent the amount of the diffracted light diffracted by the first diffraction grating 7B from decreasing.

A thickness N1 of the grating portion 7*c* of the first diffraction grating 7B is preferably four or more times the grating pitch d1. However, taking into consideration the fact that light is absorbed by the grating portion 7*c*, the thickness N1 of the grating portion 7*c* is preferably set to approximately 4 to 20 times the grating pitch d1.

Moreover, the first diffraction grating 7B including a volume-type hologram as illustrated in FIG. 2B can improve the diffraction efficiency of the first light flux L1 reflected from the member to be measured 5 and can reduce the noise in a signal.

Returning to FIG. 1, the reflection portion 6 is described. As illustrated in FIG. 1, the reflection portion 6 reflects the second light flux L2 divided by the light flux dividing portion 4 and causes the reflected second light flux L2 to enter the light flux coupling portion 8. The reflection portion 6 is arranged so that an optical path length from the light flux dividing portion 4 to the light flux coupling portion 8 in the first light flux L1 becomes equal to an optical path length from the light flux dividing portion 4 to the light flux coupling portion 8 in the second light flux L2. Because the reflection portion 6 is provided, the optical path lengths of the first light flux L1 and the second light flux L2, and the angle of the optical axis can be more easily adjusted. Thus, the displacement detection apparatus 1 can be obtained which is less affected by a fluctuation in wavelength of the light source 2 due to a change in environments, such as atmospheric pressure, humidity, and temperature.

Furthermore, the optical path lengths of the first light flux L1 and the second light flux L2 are designed so as to be equal, and therefore even if there is a fluctuation in wavelength of the light source 2 due to a change in environments, such as atmospheric pressure, humidity, and temperature, the influence on the first light flux L1 and the influence on the second light flux L2 can be set equal. As a result, there is no need to perform atmospheric pressure correction, humidity correction, temperature correction, or the like, and stable measurement can be performed regardless of the ambient environments.

The light flux coupling portion 8 superposes the first light flux L1 reflected from the member to be measured 5 and the second light flux L2 reflected from the reflection portion 6 and causes the resulting light flux to enter the second diffraction grating 9. A polarization beam splitter can be used as the light flux coupling portion 8. The first light flux L1 and second light flux L2 having reached the light flux coupling portion 8 are linearly-polarized lights perpendicular to each other. Accordingly, the first light flux L1 and the second light flux L2 of the linearly-polarized lights perpendicular to each other are superposed by the light flux coupling portion 8, and the superposed light fluxes enter the second diffraction grating 9.

The second diffraction grating 9 includes a transmission-type diffraction grating, and diffracts the first light flux L1 and second light flux L2 superposed by the light flux coupling portion 8, and causes the diffracted light fluxes to enter the light receiving portion 10. The second diffraction grating 9 is a member for canceling a change of the optical path length of the first light flux L1 when the surface to be measured 5$a$ of the member to be measured 5 is tilted (inclined) with an axis perpendicular to a surface in which the optical path of the first light flux L1 is formed, as a rotation axis. Hereinafter, the configuration of the second diffraction grating 9 is described in detail.

FIG. 3 illustrates an optical path when the surface to be measured 5$a$ of the member to be measured 5 is tilted with an axis perpendicular to a surface in which the optical path of the first light flux L1 is formed, as a rotation axis. In FIG. 3, the member to be measured 5 and the optical path of the first light flux L1 when the surface to be measured 5$a$ is not tilted are indicated by two-dot chain lines, while the member to be measured 5 and the optical path of the first light flux L1 when the surface to be measured 5$a$ is tilted by $\Delta\theta$ are indicated by solid lines.

When the member to be measured 5 is tilted by $\Delta\theta$ as illustrated in FIG. 3, the incident position of the first light flux L1 shifts and the incidence angle of the first light flux L1 on the member to be measured 5 also varies. Thus, the optical path of the first light flux L1 varies, and as a result, the optical path length of the first light flux L1 from the light flux dividing portion 4 to the light flux coupling portion 8 varies. Then, an optical path output from the second-time reflection position in the surface to be measured 5$a$ of the member to be measured 5 of the first light flux L1 moves substantially in parallel to the original optical path (an optical path when the member to be measured 5 is not tilted). In the embodiment, utilizing the above-described phenomenon, a change of the optical path length by tilting of the member to be measured 5 is cancelled by arranging the second diffraction grating 9.

Figure 4:
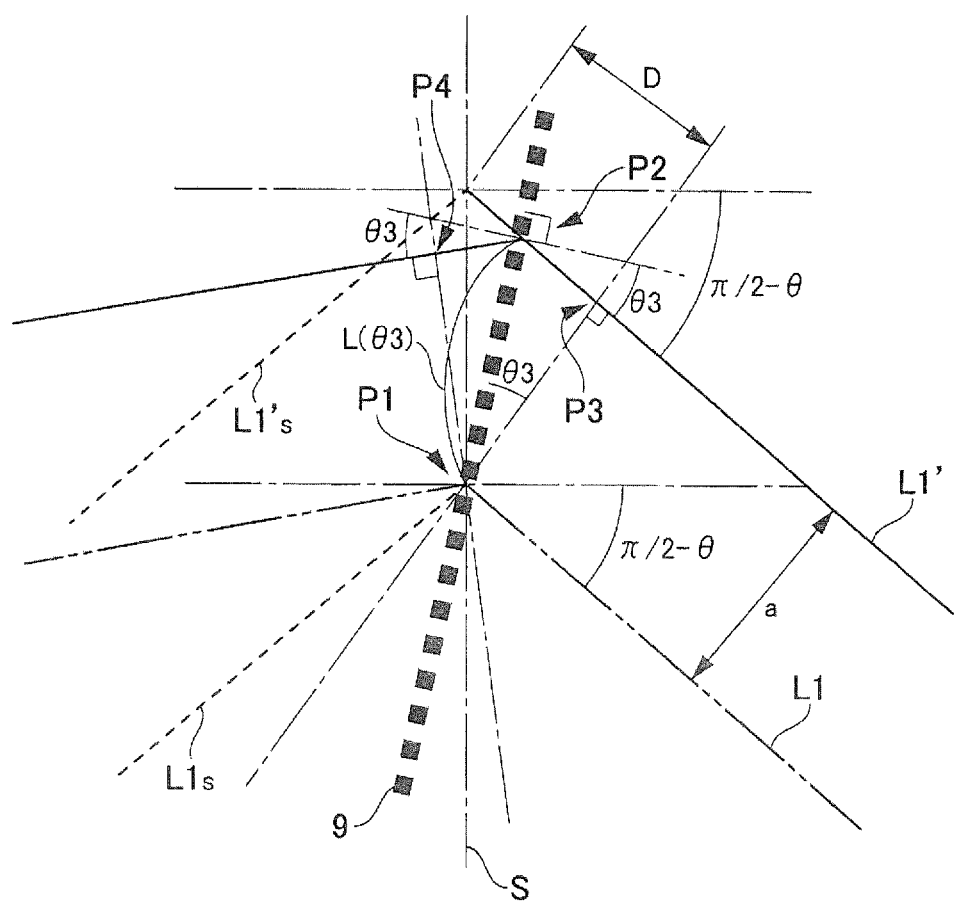
FIG. 4 is an enlarged view of a light flux around a second diffraction grating before and after the member to be measured is tilted by a certain angle.

FIG. 4 is an enlarged view of a light flux around the second diffraction grating 9 before and after the member to be measured 5 is tilted by a certain angle. In FIG. 4, the first light flux L1 when the member to be measured 5 is not tilted is indicated by a two-dot chain line, while a first light flux L1' when the member to be measured 5 is tilted is indicated by a solid line. Moreover, a one-dot chain line S (hereinafter, referred to as a straight line S) in FIG. 4 is a line parallel to the grating vector g1 of the first diffraction grating 7. Furthermore, the respective diffracted lights L1$_S$ and L1'$_S$ of the first light fluxes L1 and L1' when the diffraction grating is arranged on the straight line S are indicated by dashed lines.

In the first light flux L1 and first light flux L1', when a sum of an incidence angle on the first diffraction grating 7 and an exit angle from the first diffraction grating 7 is approximated to be constant, i.e., when Formula 2 below is established, the first light flux L1 and the first light flux L1' are parallel to each other.

$$\pi/2 - \theta + \sin^{-1}\{\lambda/d1 - \sin(\pi/2 - \theta)\} \cong \text{Constant}. \quad \text{(Formula 2)}$$

Here, the optical path lengths of the first light flux L1 and the first light flux L1' to the straight line S parallel to the first diffraction grating 7 are substantially equal. An amount of parallel displacement from the first light flux L1 to the first light flux L1' is designated by "a", and the projections of the amount of parallel displacement "a" onto the second diffraction grating 9, i.e., an intersection between the first light flux L1 and the second diffraction grating 9 and an intersection between the first light flux L1' and the second diffraction grating 9 are designated by P1 and P2, respectively, and the distance between P1 and P2 is designated by L ($\theta$3). Then, when the second diffraction grating 9 is tilted by an angle $\theta$3 from a plane perpendicular to the first light fluxes L1 and L1', L ($\theta$3) and "a" satisfy L ($\theta$3)×cos $\theta$3=a. However, the light receiving portion 10 and the like are arranged perpendicular to the travelling direction of the light flux, and therefore when the second diffraction grating 9 is not arranged, an optical path length difference D is caused between the first light flux L1 and first light flux L' received by the light receiving portion 10.

That is, when the second diffraction grating 9 is not arranged, in FIG. 4, the first light flux L1' is shorter by a distance D than the first light flux L1. Therefore, in the embodiment, the second diffraction grating 9 corrects the first optical path L1' so as to compensate for the distance D. When the intersections between a vertical line falling from the point P1 to the first light flux L1' and the first light flux L1' are designated by P3 and P4, a change of the optical path length difference caused by arranging the second diffraction grating 9 is the distance from P3 to P2 to P4. When the distance from P3 to P2 to P4 is equal to the above-described distance D, i.e., when the incidence angle $\theta$3 with respect to the second diffraction grating 9 satisfies Formula 3 below, the change of the optical length caused when the member to be measured 5 is tilted can be reduced.

$$2\{L(\theta 3) \times \sin \theta 3\} = D \quad \text{(Formula 3)}$$

Here, because L ($\theta$3)×cos $\theta$3=a, Formula 4 below is obtained.

$$\tan(\theta 3) = D/2a \quad \text{(Formula 4)}$$

Moreover, because D/a=tan($\pi/2-\theta$), Formula 4 results in Formula 5 below.

$$\tan \theta 3 = \{\tan(\pi/2 - \theta)\}/2. \quad \text{(Formula 5)}$$

Here, $\theta$ is the incidence angle of the first light flux L1 on the surface to be measured 5$a$, $\pi/2-\theta$ is the incidence angle of the first light flux L1 on the first diffraction grating 7, and $\theta$3 is the incidence angle of the first light flux L1 on the second diffraction grating 9. That is, when the second diffraction grating 9 is arranged so as to satisfy the condition expressed by Formula 2, a displacement in the optical path length caused by tilting of the member to be measured 5 can be cancelled.

Note that, the condition expressed by Formula 5 is established when the Bragg's condition is substantially satisfied, but the range of the condition is not limited. For example, even when the surface to be measured 5$a$ is tilted by approximately ±3° from a reference position, a displacement in the optical path length caused by the gradient can be cancelled.

Moreover, because the incidence angles of the first diffraction grating 7 and second diffraction grating 9 satisfy the Bragg's condition, the grating pitch d1 of the first diffraction grating 7 and the grating pitch d2 of the second diffraction grating 9 can be expressed by Formula 6 below, respectively.

$$d1=\lambda/(2\times\sin(\pi/2-\theta))$$

$$d2=\lambda/(2\times\sin\theta3) \quad \text{(Formula 6)}$$

Then, when a preferable angle of the grating vector g2 of the second diffraction grating 9 with respect to the grating vector g1 of the first diffraction grating 7 is designated by θ0, θ0 can be expressed by Formula 7 below.

$$\theta0=\pi/2-\theta-\theta3 \quad \text{(Formula 7)}$$

Then, substituting Formula 7 into Formula 5, Formula 8 below can be obtained.

$$\theta0=\pi/2-\theta-\arctan[\{\tan(\pi/2-\theta)\}/2] \quad \text{(Formula 7)}$$

Accordingly, by arranging the grating vector g1 of the first diffraction grating 7 so as to be perpendicular to the surface to be measured 5a of the member to be measured 5 and also by setting θ0 satisfying Formula 5 as the grating vector g2 of the second diffraction grating 9, a change of the optical path length of the first light flux L1 caused by tilting of the member to be measured 5 can be cancelled.

Figure 5:
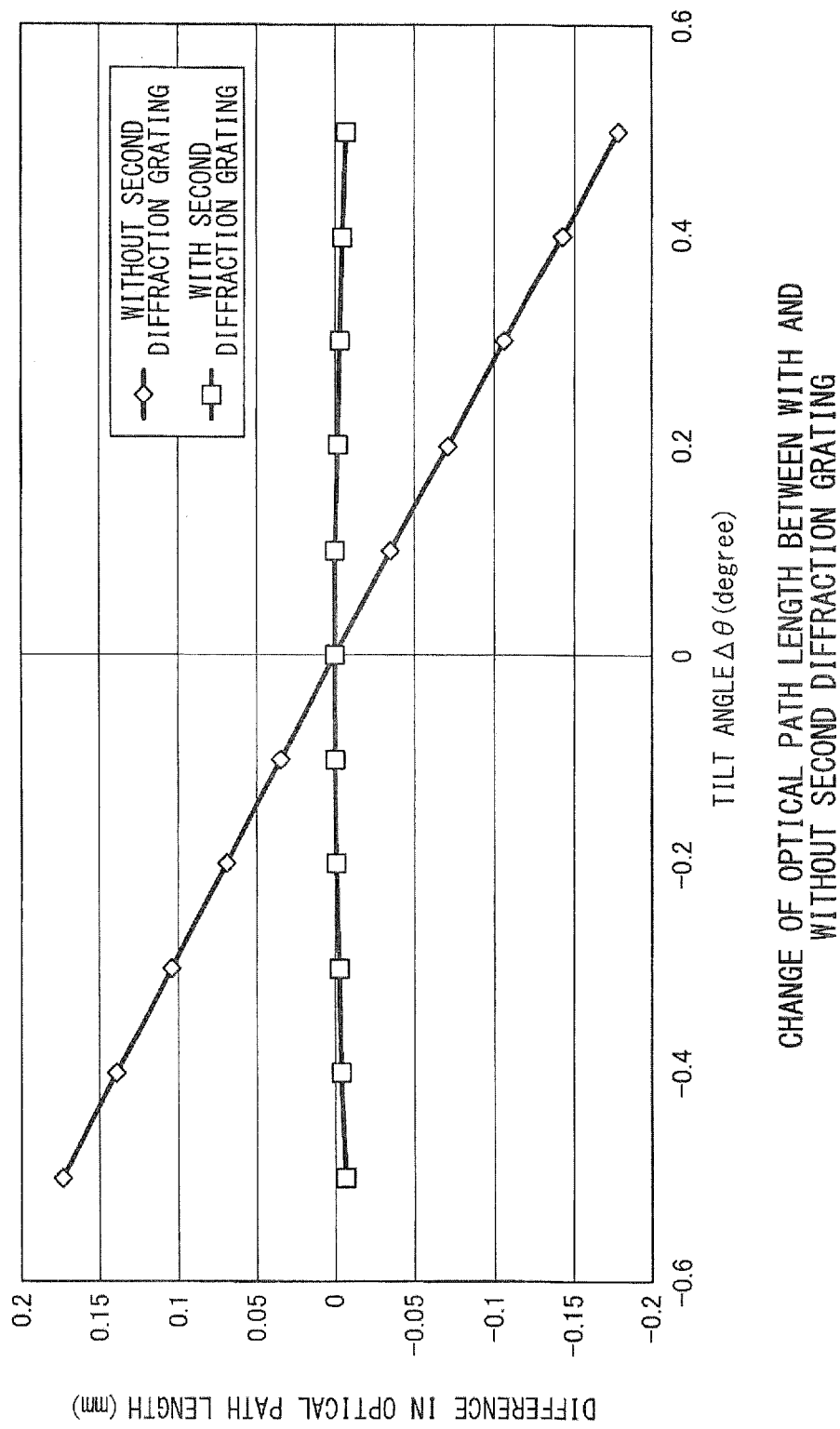
FIG. 5 is a graph illustrating a difference in the optical path length of the first light flux between when the second diffraction grating is arranged and when it is not arranged.

In the second diffraction grating 9 set in this manner, a change of the optical path length of the first light flux L1 from the light flux dividing portion 4 to the light flux coupling portion 8 is corrected. FIG. 5 is a graph illustrating a difference in the optical path length of the first light flux L1 between when the second diffraction grating 9 is arranged and when it is not arranged. The horizontal axis in FIG. 5 represents an amount of tilt (Δθ) from the reference position of the member to be measured 5, while the vertical axis represents a difference in the optical path length between when the member to be measured 5 is not tilted and when it is tilted by Δθ.

As illustrated in FIG. 5, when the second diffraction grating 9 is not arranged, the difference in the optical path length increases as the tilt angle Δθ increases, but by arranging the second diffraction grating 9, the difference in the optical path length can be reduced even if the tilt angle Δθ increases. Note that, the second light flux L2 always follows a substantially fixed optical path regardless of the position of the member to be measured 5, and therefore the second diffraction grating 9 does not affect the optical path length of the second light flux L2.

Returning to FIG. 1, the configuration of the light receiving portion 10 of the displacement detection apparatus 1 is described. The light receiving portion 10 receives the first light flux L1 and second light flux L2 diffracted by the second diffraction grating 9 and causes the same to interfere with each other. The light receiving portion 10 converts the interference intensity to an electric signal and sends the signal to the relative positional information output portion 11.

Figure 6:
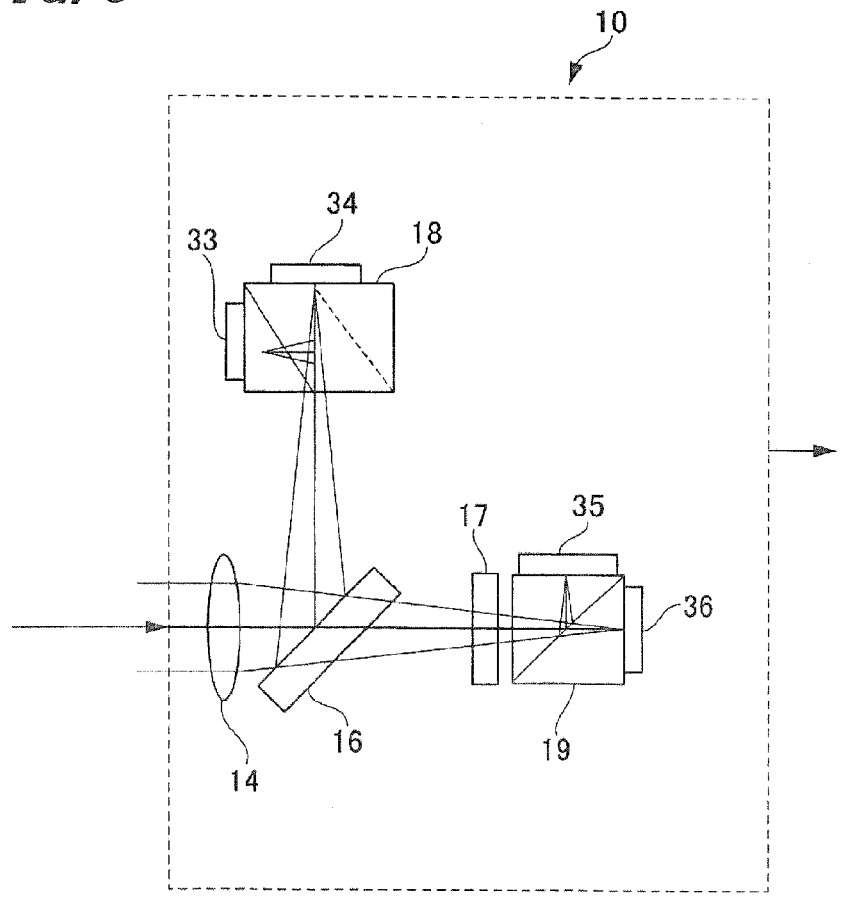
FIG. 6 illustrates a schematic configuration of a light receiving portion of the displacement detection apparatus.

FIG. 6 illustrates a schematic configuration of the light receiving portion 10. As illustrated in FIG. 6, the light receiving portion 10 includes a condensing lens 14 that condenses the first light flux L1 and second light flux L2 superposed by the light flux coupling portion 8, a half mirror 16 that divides light, a first polarization beam splitter 18, and a second polarization beam splitter 19. Moreover, a light-receiving-side phase plate 17 including a ¼ wavelength plate and the like is arranged on the optical path from the half mirror 16 to the second polarization beam splitter 19.

The first polarization beam splitter 18 is arranged so that the polarization direction of the incident light flux is tilted by 45° with respect to the incident plane. A first light receiving element 33 and a second light receiving element 34 are provided on the emission port side of light in the first polarization beam splitter 18. Moreover, a third light receiving element 35 and a fourth light receiving element 36 are provided on the emission port side of light in the second polarization beam splitter 19.

These first polarization beam splitter 18 and second polarization beam splitter 19 divide light by reflecting the interference light having an s-polarization component and transmitting the interference light having a p-polarization component therethrough. Then, in the light receiving portion 10, the first light receiving element 33 to fourth light receiving element 36 each convert the interference intensity to an electric signal and send the signal to the relative positional information output portion 11.

Figure 7:
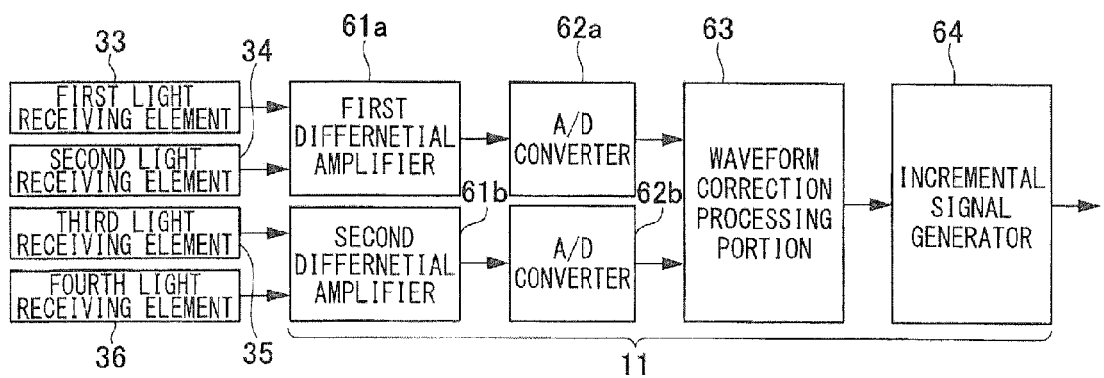
FIG. 7 is a block diagram illustrating the configuration of a relative positional information output portion.

The relative positional information output portion 11 outputs an amount of displacement in the z-direction of the member to be measured 5, based on the signal sent from the light receiving portion 10. FIG. 7 is a block diagram illustrating the configuration of the relative positional information output portion 11. As illustrated in FIG. 7, the relative positional information output portion 11 includes a first differential amplifier 61a, a second differential amplifier 61b, a first A/D converter 62a, a second A/D converter 62b, a waveform correction processing portion 63, and an incremental signal generator 64.

The first light receiving element 33 and second light receiving element 34 are connected to the first differential amplifier 61a, while the third light receiving element 35 and fourth light receiving element 36 are connected to the second differential amplifier 61b. Moreover, the first A/D converter 62a is connected to the first differential amplifier 61a, while the second A/D converter 62b is connected to the second differential amplifier 61b. Then, the first A/D converter 62a and second A/D converter 62b are connected to the waveform correction processing portion 63.

[1-2. Displacement Detection Method]

Next, a displacement detection method using the displacement detection apparatus 1 according to the embodiment is described with reference to FIG. 1, FIG. 6, and FIG. 7.

As illustrated in FIG. 1, the light emitted from the light source 2 is collimated to parallel light by the lens 3. Then, the parallel light collimated by the lens 3 enters the light flux dividing portion 4. The light incident on the light flux dividing portion 4 is divided into the first light flux L1 and second light flux L2. Here, the light flux dividing portion 4 reflects the s-polarized light among the incident light and transmits the p-polarized light. Therefore, the first light flux L1 divided by the light flux dividing portion 4 is the p-polarized light and the second light flux L2 is the s-polarized light.

Among the light fluxes divided by the light flux dividing portion 4, the first light flux L1 enters a first irradiation spot Pc1, at an incidence angle θ1, in the surface to be measured 5a of the member to be measured 5. Then, the member to be measured 5 reflects the first light flux L1 incident on the first irradiation spot Pc1 to the first diffraction grating 7.

The first light flux L1 reflected by the member to be measured 5 transmits through the first diffraction grating 7, and is diffracted by the first diffraction grating 7 and enters a second irradiation spot Pd1 different from the first irradiation spot Pc1 in the surface to be measured 5a of the member to be measured 5. Then, the member to be measured 5 causes the first light flux L1, which is diffracted by the first diffraction grating 7 and enters the second irradiation spot Pd1, to enter the light flux coupling portion 8.

On the other hand, the second light flux L2, among the light fluxes divided by the light flux dividing portion 4, enters the reflection portion 6. Then, the reflection portion 6 causes the second light flux L2 to enter the light flux coupling portion 8. As described above, the reflection portion 6 is arranged so that an optical path length from the light flux dividing portion 4 to the light flux coupling portion 8 in the first light flux L1 and an optical path length from the light flux dividing portion 4 to the light flux coupling portion 8 in the second light flux L2 become equal. Therefore, even if there is a fluctuation in wavelength of the light source 2 due to a change in atmospheric pressure, humidity, and/or temperature, the influence on the first light flux L1 and the influence on the second light flux L2 can be set equal.

The first light flux L1 and second light flux L2 incident on the light flux coupling portion 8 are superposed by the light flux coupling portion 8, resulting in interference light. The first light flux L1 and second light flux L2 superposed by the light flux coupling portion 8 are caused to enter the second diffraction grating 9 and diffracted by the second diffraction grating 9, and the diffracted first light flux L1 and second light flux L2 are caused to enter the light receiving portion 10.

In the embodiment, based on the principle described using FIG. 3 and FIG. 5, a change of the optical path length of the first light flux L1 caused when the member to be measured 5 is tilted is cancelled by the first light flux L2 being diffracted by the second diffraction grating 9. Thus, the light receiving portion 10 can receive the first light flux L1 having only information about an amount of displacement in the z-direction of the member to be measured 5.

Figure 8:
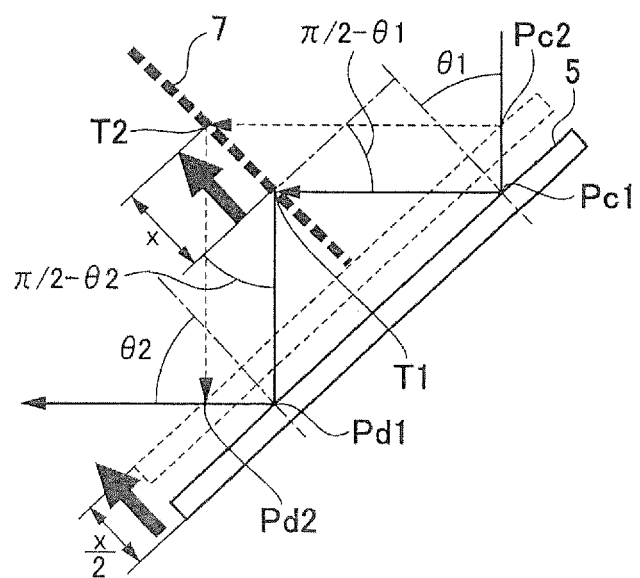
FIG. 8 is a diagram illustrating a change of the optical path when the member to be measured moves by x/2 in a z-direction from a reference position.

Here, a change in the first light flux L1 incident on the light receiving portion 10 caused by a displacement in the z-direction of the member to be measured 5 is described. FIG. 8 is a diagram illustrating a change of the optical path when the member to be measured 5 moves by x/2 in the z-direction from the reference position.

When the member to be measured 5 moves by x/2 in the height direction, the first light flux L1 irradiated to the surface to be measured 5a of the member to be measured 5 will move from the first irradiation spot Pc1 to a second irradiation spot Pc2. Moreover, the first light flux L1 reflected by the member to be measured 5 moves from a diffraction position T1 to a diffraction position T2 of the first diffraction grating 7. Here, because the first diffraction grating 7 is arranged substantially perpendicular to the surface to be measured 5a of the member to be measured 5, an interval between the diffraction position T1 and the diffraction position T2 becomes x that is twice an interval between the irradiation spot Pc1 and the irradiation spot Pc2. That is, the amount of movement of the first light flux L1 moving on the first diffraction grating 7 becomes "x" that is twice the amount of movement of the first light flux L1 moving on the member to be measured 5.

Moreover, the first diffraction grating 7 is arranged substantially perpendicular to the surface to be measured 5a of the member to be measured 5, and therefore even if the member to be measured 5 is displaced in the z-direction, the distance from Pc2 to T2 and the distance from Pc2 to Pc1 to T1 are constant. Accordingly, it is recognized that the optical path length of the first light flux L1 is always constant. That is, the wavelength of the first light flux L1 will not change. Then, when the member to be measured 5 is displaced in the z-direction, only the position where the first light flux L enters the first diffraction grating 7 will change.

Accordingly, a phase of Kx is added to the diffracted first light flux L1. Here, K is a wave number represented by $2\pi/d1$. That is, when the member to be measured 5 moves by x/2 in the z-direction, the first light flux L1 moves by "x" on the first diffraction grating 7. Therefore, a phase corresponding to Kx is added to the first light flux L1, and interference light in which one cycle of lightness and darkness is generated is received by the light receiving portion 10.

Then, a light flux La produced by superposing the first light flux L1 and second light flux L2 of linearly-polarized lights perpendicular to each other is diffracted by the second diffraction grating 9. As described above, when the member to be measured 5 is tilted, the second diffraction grating 9 diffracts the first light flux L1 so as to cancel a change of the optical path length of the first light flux L1.

In the light receiving portion 10, the light flux La is condensed by the condensing lens 14 and irradiated to the half mirror 16. The half mirror 16 divides the light flux La into two types of light. The light flux La reflected by the half mirror 16 enters the first polarization beam splitter 18.

Here, the first polarization beam splitter 18 is tilted and arranged so that the polarization directions of the first light flux L1 and second light flux L2, whose polarization directions differ by 90°, tilt by 45° with respect to the incident plane of the first polarization beam splitter 18, respectively. Thus, the first light flux L1 and second light flux L2 will have a p-polarization component and an s-polarization component with respect to the first polarization beam splitter 18, respectively. Accordingly, in the first light flux L1 and second light flux L2 transmitting through the first polarization beam splitter 18, the polarized lights having the same polarization direction interfere with each other. Accordingly, the first light flux L1 and second light flux L2 can be interfered with each other by the first polarization beam splitter 18.

Similarly, in the first light flux L1 and second light flux L2 reflected by the first polarization beam splitter 18, the polarized lights having the same polarization direction with respect to the first polarization beam splitter 18 interfere with each other. Therefore, the first light flux L1 and second light flux L2 can be interfered with each other by the first polarization beam splitter 18.

The interference light of the first light flux L1 and second light flux L2 reflected by the first polarization beam splitter 18 is received by the first light receiving element 33. Moreover, the interference light of the first light flux L1 and second light flux L2 transmitting through the first polarization beam splitter 18 is received by the second light receiving element 34. Here, signals subjected to photoelectric conversion by the first light receiving element 33 and second light receiving element 34 result in signals having phases different from each other by approximately 180°.

An interference signal $A \times \cos(Kx+\delta)$ is obtained by the first light receiving element 33 and second light receiving element 34. Here, "A" represents the amplitude of the interference, K is a wave number represented by $2\pi/d1$, "x" is an amount of movement of the first light flux L1 on the first diffraction grating 7 due to a displacement in the z-direction of the member to be measured, $\delta$ represents an initial phase and d1 is the grating pitch of the first diffraction grating 7.

Here, the interference signal obtained by the first light receiving element 33 and second light receiving element 34 does not contain components related to the wavelength of the light source 2. Accordingly, even if a fluctuation in the wavelength of the light source 2 due to a change in atmospheric pressure, humidity, and/or temperature occurs, the interference intensity will not be affected.

On the other hand, as illustrated in FIG. 6, the light flux La transmitting through the half mirror 16 enters the light-receiving-side phase plate 17. The light flux La including the first light flux L1 and second light flux L2 that are the linearly polarized lights whose polarization directions differ from each other by 90° transmits through the light-receiving-side phase plate 17, resulting in circularly-polarized lights rotating in directions opposite to each other. Then, the circularly-polarized lights rotating in directions opposite to each other are on the same optical path and therefore result in linearly polarized light by superposition, and the linearly polarized light enters the second polarization beam splitter 19.

The s-polarization component of the linearly polarized light is reflected by the second polarization beam splitter 19 and received by the third light receiving element 35. Moreover, the p-polarization component transmits through the second polarization beam splitter 19, and is received by the fourth light receiving element 36.

As described above, the linearly polarized light incident on the second polarization beam splitter 19 is produced by superimposition of the circularly-polarized lights rotating in directions opposite to each other. Then, the polarization direction of the linearly polarized light incident on the second polarization beam splitter 19 will rotate once when the member to be measured 5 moves by x/2 in the height direction. Accordingly, similarly with the third light receiving element 35 and fourth light receiving element 36, the interference signal A×cos(Kx+δ') can be obtained. Here, δ' is an initial phase.

Moreover, the signals subjected to photoelectric conversion by the third light receiving element 35 and fourth light receiving element 36 have phases different from each other by approximately 180°.

Note that, in the embodiment, the second polarization beam splitter 19, which divides the light fluxes received by the third light receiving element 35 and fourth light receiving element 36, is arranged so as to be tilted by 45° with respect to the first polarization beam splitter 18. Therefore, a signal obtained by the third light receiving element 35 and fourth light receiving element 36 has a phase shifted by approximately 90° with respect to a signal obtained by the first light receiving element 33 and second light receiving element 34.

Accordingly, a Lissajous signal can be obtained, for example, by using the signal obtained by the first light receiving element 33 and second light receiving element 34 as a cosine signal and the signal obtained by the third light receiving element 35 and fourth light receiving element 36 as a sine signal.

The signals obtained by these light receiving elements are calculated by the relative positional information output portion 11, and the amount of displacement in the z-direction of the surface to be measured 5a is counted.

As illustrated in FIG. 7, for example in the relative positional information output portion 11 according to the embodiment, first the signals having phases different from each other by 180° obtained by the first light receiving element 33 and second light receiving element 34 are differentially amplified by the first differential amplifier 61a to cancel the DC component of the interference signal.

Then, the thus-obtained signal is A/D-converted by the first A/D converter 62a, and the amplitude, offset, and phase of the converted signal are corrected by the waveform correction processing portion 63. The corrected signal is calculated, for example, as an incremental signal with an A phase, by the incremental signal generator 64.

Similarly, the signals obtained by the third light receiving element 35 and fourth light receiving element 36 are differentially amplified by the second differential amplifier 61b, and the resulting signal is A/D-converted by the second A/D converter 62b. Then, the amplitude, offset, and phase of the converted signal are corrected by the waveform correction processing portion 63, and the corrected signal is output, as an incremental signal with a B phase that differs by 90° from the A phase, from the incremental signal generator 64.

With regard to the incremental signals with two phases, obtained in this manner, the lead or lag thereof is discriminated by a non-illustrated pulse discriminator circuit or the like. Thus, it is possible to detect whether the amount of displacement in the z-direction of the member to be measured 5 is in a plus direction or minus direction.

Moreover, by counting the number of pulses of the incremental signal with a non-illustrated counter, the number of cycles of changes of the intensity of the interference light of the first light flux L1 and second light flux L2 can be measured. Thus, the amount of displacement in the z-direction of the member to be measured 5 is detected.

Note that, the relative positional information output by the relative positional information output portion 11 according to the embodiment may be the above-described incremental signals with two phases, or may be a signal including the amount of displacement and displacement direction calculated from the incremental signals with two phases.

As described above, in the embodiment, the first diffraction grating 7 is arranged so that the grating vector g1 thereof becomes substantially perpendicular to the surface to be measured 5a of the member to be measured 5. Thus, even if the member to be measured 5 is displaced in the z-direction, the optical path length of the first light flux L1 that is object light will not change, but only the incident position of the first light flux L1 on the first diffraction grating 7 will change. As a result, the interference signal obtained by the light receiving portion 10 does not contain the component related to the wavelength of the light source 2. Therefore, the displacement detection apparatus 1 according to the embodiment can reduce the influence on the interference intensity from a fluctuation in the oscillation wavelength of the light source 2 due to changes in the environments, such as atmospheric pressure, humidity, and/or temperature.

Moreover, in the embodiment, by arranging the second diffraction grating 9, a change of the optical path length of the first light flux L1, which is object light, caused by tilting of the surface to be measured 5a of the member to be measured 5 can be cancelled. Thus, even when the member to be measured 5 is tilted, the amount of displacement in the z-direction of the surface to be measured 5a of the member to be measured 5 can be more precisely detected.

Then, in the displacement detection apparatus 1 according to the embodiment, a driving function, such as an actuator using a magnet and a coil, is unnecessary unlike in the conventional displacement detection apparatus, and therefore generation of heat in use can be suppressed. Furthermore, because a driving mechanism does not need to be operated, problems, such as restriction on the response frequency, can be resolved and the use condition can be expanded. Then, in the displacement detection apparatus 1 according to the embodiment, because a driving mechanism is not used, high-speed and stable measurement is possible.

When a semiconductor laser or the like is used as the light source 2, the oscillation wavelength of the light source 2 will slightly change due to the temperature of the light source, as described above. The above-described change results in a change of the diffraction angle of the first diffraction grating 7 and/or second diffraction grating 9. Therefore, even when the optical path length of object light will not change with a displacement of the member to be measured 5, as with the displacement detection apparatus 1 according to the first embodiment, a deviation in the optical axis might be caused and a decrease in the output of the interference signal might be caused. Then, hereinafter, a displacement detection apparatus capable of suppressing a change in gradient of a light flux due to a change of the oscillation wavelength of the light source 2 is described.

<<2. Second Embodiment: a displacement detection apparatus having arranged therein a diffraction grating that cancels a change of an optical path length and a change of the wavelength of a light source>>

Figure 9:
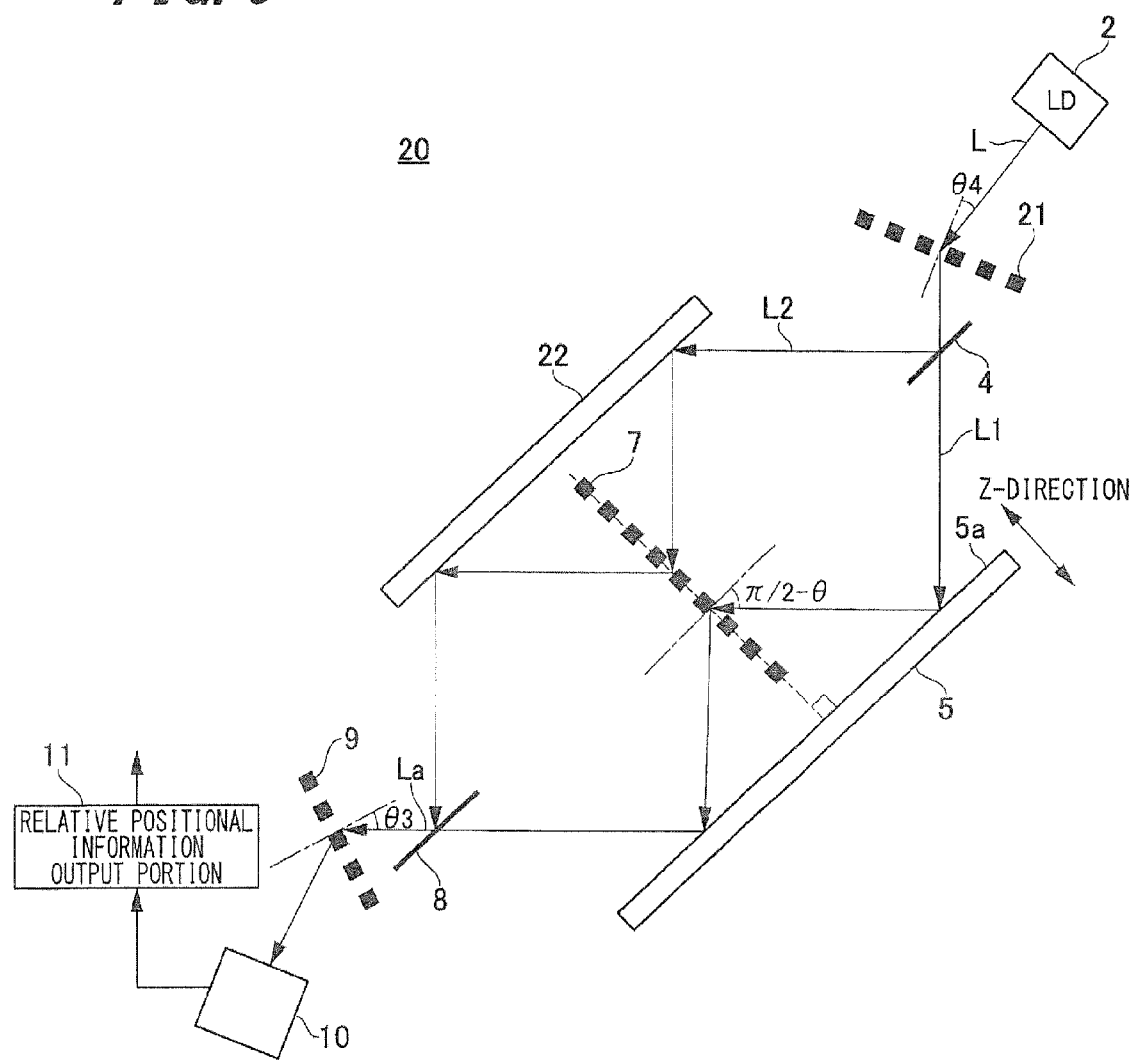
FIG. 9 is a schematic configuration diagram of a displacement detection apparatus according to a second embodiment of the present invention.

FIG. 9 is a schematic configuration diagram of a displacement detection apparatus according to a second embodiment of the present invention. A displacement detection apparatuses 20 according to the embodiment differs from the displacement detection apparatus 1 according to the first embodiment in that the second light flux L2 is diffracted by the first diffraction grating 7 and that a third diffraction grating 21 is provided in the vicinity of the light source 2. In FIG. 9, the portions corresponding to those of FIG. 1 are given the same reference numerals to omit the duplicated description.

In the embodiment, a reflection portion 22 is arranged at a position facing the member to be measured 5 across the first diffraction grating 7. Moreover, the reflection portion 22 is preferably arranged so that the reflection plane thereof becomes substantially perpendicular to the grating vector of the first diffraction grating 7, as with the relationship between the member to be measured 5 and the first diffraction grating 7. Then, the reflection portion 22 is arranged so as to cause the second light flux L2, which is divided by the light flux dividing portion 4, to enter the first diffraction grating 7 and also so as to reflect the second light flux L2 diffracted by the first diffraction grating 7 again and cause the second light flux L2 to enter the light flux coupling portion 8. Moreover, the reflection portion 22 is arranged so that an optical path length of the first light flux L1 from the light flux dividing portion 4 to the light flux coupling portion 8 and an optical path length of the second light flux L2 from the light flux dividing portion 4 to the light flux coupling portion 8 become equal.

Moreover, in the embodiment, the third diffraction grating 21 is arranged between the light source 2 and the light flux dividing portion 4. The third diffraction grating 21 is arranged so as to cancel a change of the diffraction angle of the first diffraction grating 7 and a change of the diffraction angle of the second diffraction grating 9 caused by a change of the oscillation wavelength of the light source 2 due to a change in temperature and/or humidity.

Moreover, as illustrated in FIG. 9, when the incidence angle on the first diffraction grating 7 is designated by $\pi/2-\theta$, the incidence angle on the second diffraction grating 9 is designated by $\theta 3$, and the incidence angle on the third diffraction grating 7 is designated by $\theta 4$, the incidence conditions with respect to the respective diffraction gratings can be expressed by Formula 9 below when the Bragg's condition is satisfied.

$$\theta 4 = \pi/2 - \theta - \theta 3 \quad \text{(Formula 9)}$$

Then, also in the displacement detection apparatus 20 according to the embodiment, an amount of displacement in the z-direction of the member to be measured 5 can be detected, as with the first embodiment.

In the embodiment, not only the first light flux L1 is diffracted by the first diffraction grating 7, but also the second light flux L2 is diffracted by the first diffraction grating 7 as with the first light flux L1. Thus, a deviation in the optical axis in the first diffraction grating 7 due to a change of the oscillation wavelength of the light source 2 is caused both in the first light flux L1 and in the second light flux L2. Thus, a change amount in the gradient of the first light flux L1 and a change amount in the gradient of the second light flux L2 after the first light flux L1 and second light flux L2 are superposed by the light flux coupling portion 8 can be matched and stable interference light can be obtained.

Furthermore, in the embodiment, a change of the diffraction angle of the first diffraction grating 7 and a change of the diffraction angle of the second diffraction grating 9 due to a change of the oscillation wavelength of the light source 2 are cancelled by the third diffraction grating 21. Thus, a change of the gradient of the light flux incident on the light receiving portion 10 can be suppressed.

Usually, in order to miniaturize the displacement detection apparatus, each optical part needs to be designed so that the effective diameter thereof becomes small, but when the gradient of a light flux increases, there is a problem that vignetting occurs. In contrast, in the displacement detection apparatus 20 according to the embodiment, even when the oscillation wavelength of the light source 2 changes, a change of the gradient of the light flux can be suppressed, and therefore even when the effective diameter of each optical part is reduced, vignetting can be suppressed and the displacement detection apparatus 20 can be used in a wider temperature range.

Other than the above, also in the embodiment the similar effect as the first embodiment can be obtained by using the second diffraction grating 9.

<<3. Third Embodiment: a displacement detection apparatus having arranged therein a diffraction grating that cancels a change of an optical path length and a change of the wavelength of a light source>>

Figure 10:
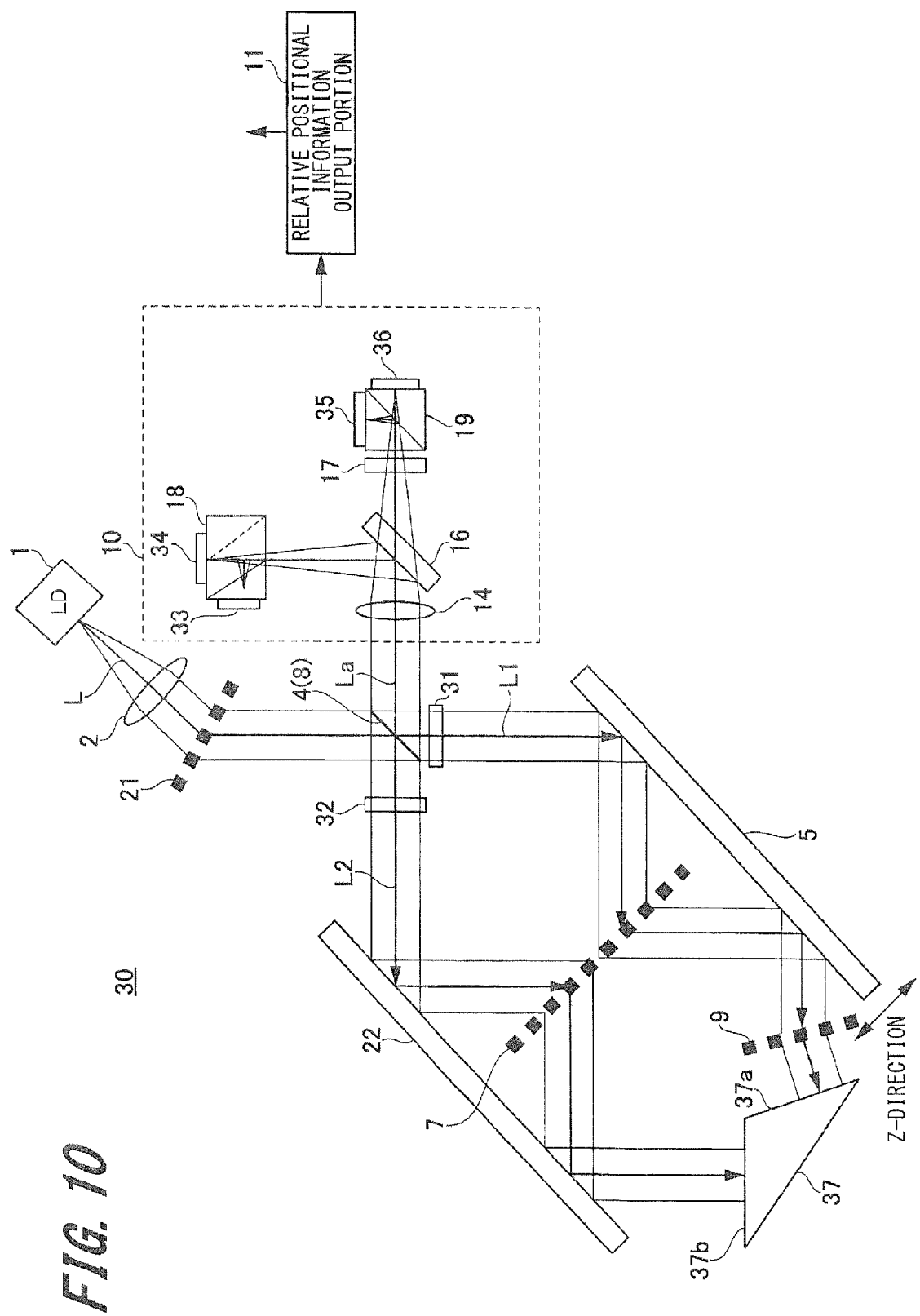
FIG. 10 is a schematic configuration diagram of a displacement detection apparatus according to a third embodiment of the present invention.

Next, a displacement detection apparatus according to the third embodiment of the present invention is described. FIG. 10 is a schematic configuration diagram of the displacement detection apparatus according to the embodiment. A displacement detection apparatus 30 according to the embodiment differs from the displacement detection apparatus 20 according to the second embodiment in that the first light flux L1 and second light flux L2 are caused to enter the first diffraction grating 7 twice and then enter the light receiving portion 10. In FIG. 10, the portions corresponding to those of FIG. 1 and FIG. 9 are given the same reference numerals to omit the duplicated description.

[3-1. Configuration]

As illustrated in FIG. 10, in the displacement detection apparatus 30 according to the embodiment, a first phase plate 31 is arranged between the light flux dividing portion 4 and the member to be measured 5, and a second phase plate 32 is arranged between the light flux dividing portion 4 and the reflection portion 22. The first phase plate 31 and second phase plate 32 each include a ¼ wavelength plate and the like.

Moreover, in the displacement detection apparatus 30 according to the embodiment, a return reflection portion 37 is arranged on an optical path of the first light flux L1 and an optical path of the second light flux L2 at a position opposite to the reflection portion 22 and a side on which the light source 2 is arranged. Furthermore, in the embodiment, the second diffraction grating 9 is arranged on the optical path of the first light flux L1 between the return reflection portion 37 and the member to be measured 5.

The return reflection portion 37 includes a triangular mirror having a first reflection plane 37a and a second reflection plane 37b. The first light flux L1 having transmitted through the light flux dividing portion 4 and then having been reflected twice by the surface to be measured 5a of the member to be measured 5 enters the first reflection plane 37a of the return reflection portion 37. Then, the first reflection plane 37a reflects the incident first light flux L1 to the member to be measured 5 side through the same optical path as an optical path when the first light flux L1 enters the first reflection plane 37a. Accordingly, the first light flux L1 reflected by the first reflection plane 37a is diffracted by the second diffraction grating 9, reflected by the surface to be measured 5a of the member to be measured 5, reflected by the first diffraction grating 7, reflected again by the surface to be measured 5a of the member to be measured 5, and then enters the light flux dividing portion 4 through the first phase plate 31.

The second light flux L2 having been reflected by the light flux dividing portion 4 and then reflected twice by the reflection plane of the reflection portion 22 enters the second reflection plane 37b of the return reflection portion 37. Then, the second reflection plane 37b reflects the incident second light flux L2 back to the reflection portion 22 side through the same optical path as an optical path when the second light flux L2 enters the second reflection plane 37b. Accordingly, the second light flux L2 reflected by the second reflection plane 37b is reflected by the reflection plane of the reflection portion 22, reflected by the first diffraction grating 7, reflected again by the reflection portion 22, and then enters the light flux dividing portion 4 through the second phase plate 32.

Moreover, the return reflection portion 37 is arranged so that an optical path length of the first light flux L1 between the light flux dividing portion 4 and the return reflection portion 37 and an optical path length of the second light flux L2 between the light flux dividing portion 4 and the return reflection portion 37 become substantially equal. Provision of the return reflection portion 37 can facilitate the adjustment of the optical path length of the first light flux L1, optical path length of the second light flux L2, and angle of the optical axis in manufacturing the displacement detection apparatus 30. As a result, the displacement detection apparatus 1 can be less affected by a fluctuation in wavelength of the light source 2 due to a change in environments, such as atmospheric pressure, humidity, and temperature.

In the embodiment, the first light flux L1 and second light flux L2 are reflected by the return reflection portion 37, so that the first light flux L1 and second light flux L2 are diffracted twice by the first diffraction grating 7 and enter the light flux dividing portion 4. Then, the light flux dividing portion 4 couples the returned first light flux 1 and the second light flux 2 and causes the resulting flux to enter the light receiving portion 10. That is, in the embodiment, the light flux dividing portion 4 serves also as the light flux coupling portion 8.

[3-2. Displacement Detection Method]

Next, a displacement detection method using the displacement detection apparatus 30 according to the embodiment is described with reference to FIG. 10, FIG. 6 and FIG. 7.

As illustrated in FIG. 10, the light emitted from the light source 2 is collimated to parallel light by the lens 3. Then, the parallel light collimated by the lens 3 enters the light flux dividing portion 4. The light incident on the light flux dividing portion 4 is divided into the first light flux L1 and second light flux L2. Here, the light flux dividing portion 4 reflects the s-polarized light among the incident lights and transmits the p-polarized light. Therefore, the first light flux L1 of p-polarization having transmitted through the light flux dividing portion 4 is irradiated to the first phase plate 31, while the second light flux L2 of s-polarization reflected by the light flux dividing portion 4 is irradiated to the second phase plate 32.

Then, the first light flux L1 and second light flux L2 result in circularly-polarized light by the first phase plate 31 and second phase plate 32. As illustrated in FIG. 10, the circularly-polarized first light flux 1 enters the surface to be measured 5a of the member to be measured 5. Then, the first light flux L1 is reflected by the member to be measured 5 and enters the first diffraction grating 7.

The first light flux L1 incident on the first diffraction grating 7 is diffracted by the first diffraction grating 7, and then again enters the member to be measured 5. Next, the first light flux L1 incident on the member to be measured 5 is reflected again by the member to be measured 5 and enters the second diffraction grating 9, and the first light flux L1 diffracted by the second diffraction grating 9 is reflected by the first reflection plane 37a of the return reflection portion 37. Then, the first light flux L1 reflected by the return reflection portion 37 follows the same optical path as an optical path reaching the return reflection portion 37 from the light flux dividing portion 4, and again enters the light flux dividing portion 4. Again, the first light flux L1 incident on the light flux dividing portion 4 results in the linearly polarized light perpendicular to the original p-polarized light, i.e., results in s-polarized light, by the first phase plate 31.

On the other hand, the second light flux L2, which is divided by the light flux dividing portion 4 and results in the circularly-polarized light by the second phase plate 32, enters the reflection plane of the reflection portion 22. Then, the second light flux L2 is reflected by the reflection portion 22 and enters the first diffraction grating 7.

The second light flux L2 incident on the first diffraction grating 7 is diffracted by the first diffraction grating 7 and again enters the reflection portion 22. Next, the second light flux L2 incident on the reflection portion 22 is reflected again by the reflection portion 22, enters the return reflection portion 37, and is reflected by the second reflection plane 37b of the return reflection portion 37. Then, the second light flux L2 reflected by the return reflection portion 37 follows the same optical path as an optical path reaching the return reflection portion 37 from the light flux dividing portion 4, and again enters the light flux dividing portion 4. Again, the second light flux L2 incident on the light flux dividing portion 4 results in the linearly polarized light perpendicular to the original s-polarized light, i.e., results in p-polarized light, by the second phase plate 32.

Then, the first light flux L1 and second light flux L2 incident on the light flux dividing portion 4 are superposed by the light flux dividing portion 4, and then enter the light receiving portion 10. Because the processing in the light receiving portion 10 and the subsequent stages is the same as that of the first embodiment, the duplicated description is omitted.

Also in the embodiment, as with the first embodiment, the interference light of the first light flux L1 and second light flux L2 is obtained by the light receiving portion 10, so that the amount of displacement in the z-direction of the member to be measured 5 can be calculated. Here, in the displacement detection apparatus 30 according to the embodiment, the first light flux L1 is diffracted twice by the first diffraction grating 7. Therefore, a phase of 2Kx is added to the first light flux L1 diffracted twice, based on the principle described using FIG. 8. Here, K is a wave number represented by $2\pi/d1$ as with the first embodiment. Moreover, x represents the amount of movement of the first light flux L1 on the first diffraction grating 7. That is, when the member to be measured 5 moves by x/2 in the z-direction, the first light flux L1 moves by "x", which is twice x/2, on the first diffraction grating 7. Furthermore, the first light flux L1 is diffracted twice by the first diffraction grating 7, so that the phase of 2Kx is added to the first light flux L1, and interference light in which two cycles of lightness and darkness are generated is received by the light receiving portion 10.

Accordingly, an interference signal $A \times \cos(2Kx+\delta)$ can be obtained by the first light receiving element 33 and second light receiving element 34. Moreover, an interference signal A×cos(2Kx+δ') can be obtained by the third light receiving element 35 and fourth light receiving element 36.

As described above, when a grating pitch of the first diffraction grating 7 of the displacement detection apparatus 30 according to the embodiment and a grating pitch of the first diffraction grating 7 of the displacement detection apparatus 1 according to the first embodiment are set to the same, the displacement detection apparatus 30 according to the embodiment can have twice the resolution as compared with the displacement detection apparatus 1 according to the first embodiment.

Then, also in the embodiment, as with the first embodiment, because the second diffraction grating 9 is arranged, a change of the optical path length can be cancelled even when the member to be measured 5 is tilted. Thus, the amount of displacement in the z-direction of the member to be measured 5 can be more precisely detected.

Furthermore, also in the embodiment, as with the second embodiment, because the third diffraction grating 21 is arranged, a deviation in the optical axis can be corrected even when the oscillation wavelength of the light source 2 fluctuates due to a change in environments, such as temperature, humidity, and/or atmospheric pressure. Thus, a decrease of the interference intensity can be prevented.

4. <<Use Example of Displacement Detection Apparatus>>

Figure 11:
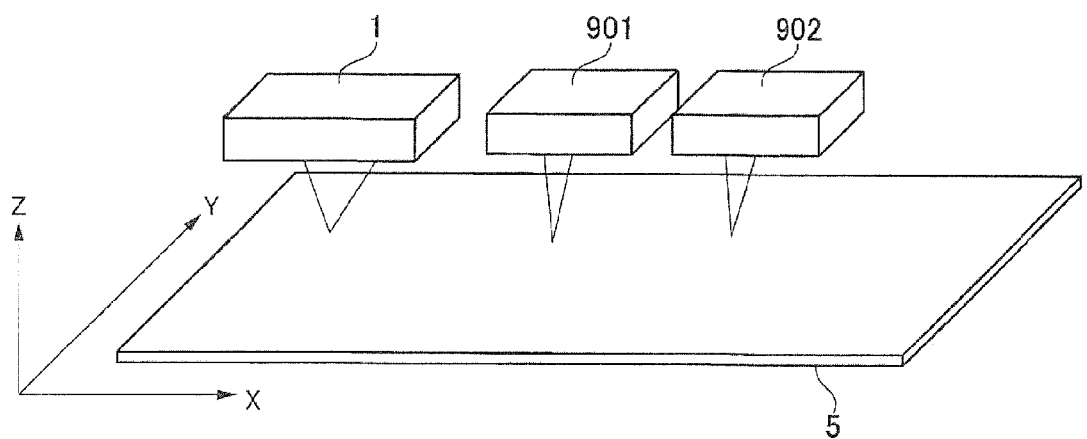
FIG. 11 is a schematic view illustrating a first use example of the displacement detection apparatus.
Figure 12:
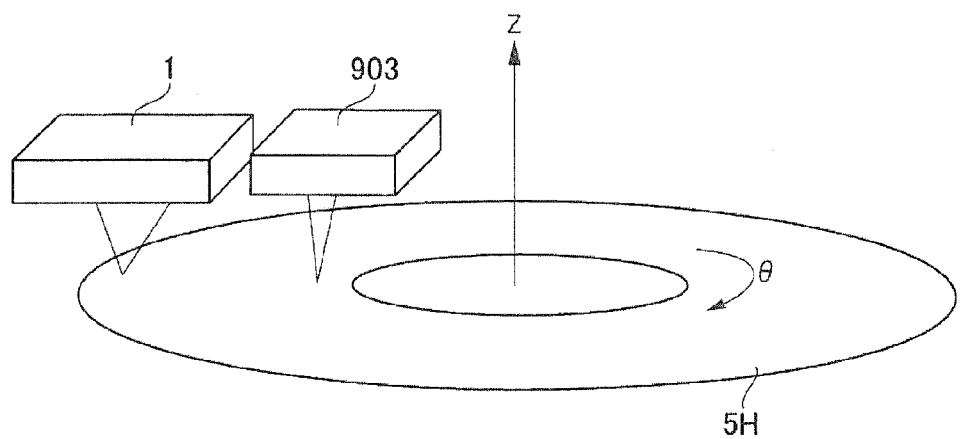
FIG. 12 is a schematic view illustrating a second use example of the displacement detection apparatus.

Next, use examples of the displacement detection apparatuses according to the above-described first to third embodiments are described with reference to FIG. 11 and FIG. 12. FIG. 11 is a schematic view illustrating a first use example. FIG. 12 is a schematic view illustrating a second use example. Note that, the member to be measured 5 in the use examples illustrated in FIG. 11 and FIG. 12 use a diffraction grating scale, for example.

In the use example illustrated in FIG. 11, there are provided an X-axis linear encoder 901 that detects a displacement in a first direction X parallel to the surface to be measured 5a in the member to be measured 5 and a Y-axis linear encoder 902 that detects a displacement in a second direction Y parallel to the surface to be measured in the member to be measured 5 and perpendicular to the first direction X. Moreover, the displacement detection apparatus 1 according to the first embodiment is provided in order to detect a displacement in the height direction (Z-direction) of the surface to be measured 5a of the member to be measured 5.

Thus, the X-axis linear encoder 901 and Y-axis linear encoder 902 can measure a displacement in the X-axis and Y-axis of the member to be measured 5, respectively, while the displacement detection apparatus 1 according to the first embodiment can detect a displacement in the height direction, i.e., Z-direction, of the surface to be measured 5a of the member to be measured 5. This allows for three-dimensional measurement.

A member to be measured 5H in the use example illustrated in FIG. 12 rotates about the Z-axis. Then, in the use example, there are provided: a rotary encoder 903 that detects the angle information about the member to be measured 5H; and the displacement detection apparatus 1 according to the first embodiment for detecting a displacement in the height direction (Z-direction) of the surface to be measured 5a of the member to be measured 5. In the use example, angle information θ about the member to be measured 5H and a displacement in the Z-axis can be detected to allow for three-dimensional measurement.

Note that, the present invention is not limited to the embodiments that are described above and illustrated in the drawings, but various variations are possible without departing from the scope of the invention described in the claims. In the above-described embodiments, the light emitted from the light source may be supplied not only through gas but also through liquid or through vacuum space.

Moreover, the reflection portions 6 and 22 for reference light may be moved so as to be linked with the movement of the member to be measured 5. That is, the reflection portions 6 and 22 for reference light are moved by the same amount of movement as the amount of movement in the height direction in the member to be measured 5. This allows a phase, whose sign differs from the phase of the first light flux L1, to be added to the second light flux L2.

Moreover, various lenses described in the above-described first to third embodiments may be a single lens, or may be a lens group comprising a plurality of lenses.

REFERENCE SIGNS LIST

1, 2, 30 displacement detection apparatus,
2 light source,
3 lens,
4 light flux dividing portion,
5 member to be measured,
6 reflection portion,
7 first diffraction grating,
8 light flux coupling portion,
9 second diffraction grating,
10 light receiving portion,
11 relative positional information output portion,
14 condensing lens,
16 half mirror,
17 light-receiving-side phase plate,
18 first polarization beam splitter,
19 second polarization beam splitter,
21 third diffraction grating,
22 reflection portion,
31 first phase plate,
32 second phase plate,
33 first light receiving element,
34 second light receiving element,
35 third light receiving element,
36 fourth light receiving element,
37 return reflection portion

What is claimed is:

1. A displacement detection apparatus, comprising:
   a light source configured to emit light;
   a light flux dividing portion configured to divide light emitted from the light source into a first light flux and a second light flux;
   a first transmission-type diffraction grating configured to diffract the first light flux divided by the light flux dividing portion and reflected by a surface to be measured of a member to be measured, and cause the diffracted first light flux to enter again the surface to be measured of the member to be measured;
   a reflection portion configured to reflect the second light flux divided by the light flux dividing portion;
   a light flux coupling portion configured to couple the first light flux, which is caused to enter the surface to be measured of the member to be measured after being diffracted by the first diffraction grating and is reflected by the surface to be measured of the member to be measured, and the second light flux reflected by the reflection portion;
   a light receiving portion configured to receive interference light that is obtained by coupling the first light flux and the second light flux by the light flux coupling portion;

a second transmission-type diffraction grating arranged on an optical path between the member to be measured and the light receiving portion of the first light flux, the second transmission-type diffraction grating being configured to diffract the first light flux, which is caused to enter the surface to be measured of the member to be measured after being diffracted by the first diffraction grating and is reflected by the surface to be measured of the member to be measured; and a relative positional information output portion configured to output displacement information in a height direction of the surface to be measured of the member to be measured, based on an intensity of the interference light received by the light receiving portion.

2. The displacement detection apparatus according to claim 1, wherein an optical path length from the light flux dividing portion to the light flux coupling portion through the first diffraction grating in the first light flux and an optical path length from the light flux dividing portion to the light flux coupling portion through the reflection portion in the second light flux are set to be substantially equal.

3. The displacement detection apparatus according to claim 1, wherein a grating vector of the first diffraction grating is arranged substantially perpendicular to the surface to be measured of the member to be measured.

4. The displacement detection apparatus according to claim 2, wherein respective incidence angles of the first light flux on the first diffraction grating and the second diffraction grating satisfy a Bragg's condition, and an incidence angle $\theta$ when the first light flux emitted from the light flux dividing portion firstly enters the surface to be measured of the member to be measured and an angle $\theta 0$ of a grating vector of the second diffraction grating with respect to a grating vector of the first diffraction grating satisfy a formula below $$\theta 0 = \pi/2 - \theta - \arctan[\{\tan(\pi/2 - \theta)\}/2].$$

5. The displacement detection apparatus according to any one of claim 1, further comprising a third diffraction grating arranged on an optical path between the light source and the light flux dividing portion.

* * * * *